United States Patent [19]
Hayashi

[11] Patent Number: 5,958,318
[45] Date of Patent: Sep. 28, 1999

[54] WEATHER STRIP AND METHOD AND APPARATUS FOR EXTRUSION-MOLDING THE SAME

[75] Inventor: Keizo Hayashi, Nagoya, Japan

[73] Assignee: Toyoda Gosei Co., Ltd., Aichi-ken, Japan

[21] Appl. No.: 08/885,195

[22] Filed: Jun. 30, 1997

[51] Int. Cl.⁶ .................................................. B29C 47/16
[52] U.S. Cl. .................... 264/167; 264/177.16; 425/381; 425/465; 425/466
[58] Field of Search ................................. 264/167, 177.1, 264/177.16; 425/465, 466, 381

[56] References Cited

U.S. PATENT DOCUMENTS

| | | | |
|---|---|---|---|
| 3,587,281 | 6/1971 | Lemelson | 425/465 |
| 3,702,227 | 11/1972 | Hureau | 425/466 |
| 4,313,327 | 2/1982 | O'Connor . | |
| 4,422,839 | 12/1983 | Przytulla . | |
| 5,110,529 | 5/1992 | Arima | 264/167 |
| 5,441,688 | 8/1995 | Goto et al. | 264/167 |
| 5,447,670 | 9/1995 | Ito et al. . | |
| 5,486,325 | 1/1996 | Arima | 264/167 |

*Primary Examiner*—Jill L. Heitbrink
*Attorney, Agent, or Firm*—Pillsbury Madison & Sutro Intellectual Property Group

[57] ABSTRACT

A die is formed with an opening having substantially the same shape as a fundamental cross-sectional shape of an extrusion member. A first core is formed with a projecting portion projecting forward beyond a front surface of the die. A movable die for changing the external shape of a sealing portion is disposed on the front surface of the die. The movable die is allowed to move between a position where a curved surface formed at the forward end thereof is kept away from the projecting portion of the first core and another position where the curved surface comes close to the projecting portion. Further, first and second movable cores are inserted in the opening of the die, these movable cores being moved forward and backward along the direction in which EPDM is extruded.

2 Claims, 14 Drawing Sheets

# WEATHER STRIP AND METHOD AND APPARATUS FOR EXTRUSION-MOLDING THE SAME

BACKGROUND OF THE INVENTION

1. Field of the Invention

The present invention relates to a weather strip extrusion into the shape of a long piece whose cross-sectional shape varies along its longitudinal direction, and a method and an apparatus for extrusion-molding the same weather strip.

2. Description of Related Art

It has conventionally been customary to attach a weather strip along the circumferential edge of openings of a motor vehicle body for providing a seal between the car body and mating members such as doors. As shown in FIG. 26, a weather strip 51 comprises extrusion members 52, 53, 54 and 55 formed into the shape of a long piece by extrusion molding and having a uniform cross-sectional shape along the longitudinal direction thereof, respectively, and molded members 56, 57, 58, 59 and 60 (the dotted portions in FIG. 26) formed by means of mold-molding apparatus, such as injection-molding apparatus, so as to be continuously connected to the extrusion members 52 to 55.

The extrusion member 55 of the weather strip 51 comprises a mounting base portion 61 which is to be fixed to the vehicle body and a sealing portion 63 projecting from the mounting base portion 61 and having an inside hollow portion 62 as shown in FIG. 27 (which is a cross-sectional view taken along the line XXVII—XXVII of FIG. 26), for example. When the edge portion of a door glass is brought into contact with the sealing portion 63, a sealing wall 63a of the sealing portion 63 deforms to provide a seal between the sealing portion 63 and the door glass edge portion. A reinforcing bridge portion 64 may be formed in the hollow portion 62 so as to cross inside the hollow portion 62.

By the way, it is necessary for a part of the weather strip 51 which is to be attached to the roof section of the motor vehicle, when the upper edge of the door glass is brought into contact therewith, to wrap up the upper edge of the door glass as reliably as possible. For this purpose, the extrusion member 54 corresponding to the roof section is formed with a concave portion 65 in the sealing wall 63a of the sealing portion 63 as shown in FIG. 28 (which is a cross-sectional view taken along the line XXVIII—XXVIII of FIG. 26). Meanwhile, the extrusion member 55 corresponding to the rear quarter section of the motor vehicle is not required to wrap up the door glass edge so reliably when the rear edge of the door glass is brought into contact therewith, and therefore it is not formed with such concave portion 65 as shown in FIG. 27. Namely, according to the prior art, when forming the extrusion members 54, 55, the members with and without the concave portion 65 are formed separately. Incidentally, in the extrusion member 54 for the roof section, no bridge portion 64 is formed and the thickness of the inner peripheral wall of the hollow sealing portion 63 is partially made thin in order that the extrusion member 54 can be deformed more reliably when wrapping up the upper edge of the door glass.

The cross-sectional shape obtained by the extrusion molding is unchanged at any point of the member along the longitudinal direction. Further, for the cross-sectional shape of the member having the hollow portion, it is difficult to change the cross-sectional shape of the hollow portion. It is therefore necessary that the extrusion members 54, 55 having different cross-sectional shapes agreeable to the purposes for which they are used, are formed separately.

Further, in order to obtain these extrusion members 54, 55, it is necessary to use different molding dies. Moreover, it is necessary to mold the molded member 58 for connecting these extrusion members 54, 55. In consequence, the manufacturing operation becomes complicated and equipment such as the molding dies and the molds for each of the members, extruder and mold-molding apparatus are specially required, thus giving rise to a problem that the production cost comes expensive. In addition, many other problems are raised such as that the need for many pieces of equipment causes the need for a large space for the installation of such equipment.

The present invention solves the above problems. An object of the present invention is to provide a weather strip whose cross-sectional shape varies along its longitudinal direction and a method and an apparatus for extrusion-molding the same weather strip by which the manufacturing can be simplified at the time of extrusion-molding and the cost can be reduced. Further, another object of the present invention is to reduce the cost by forming a part of the weather strip which is attached at least from the roof section to the rear quarter section, into a piece of extrusion member whose cross-sectional shape varies along its longitudinal direction.

SUMMARY OF THE INVENTION

The gist of the invention in one aspect resides in a method for extrusion-molding a weather strip whose cross-sectional shape varies along its longitudinal direction, which method comprises the steps of: extruding a polymer material through an opening formed in a die, the opening having substantially the same shape as a fundamental cross-sectional shape of the weather strip; moving a movable die provided on a front surface of the die close to and away from a projecting portion provided on a core for forming a hollow portion of the weather strip so as to change the flow passage for the polymer material extruded through the opening; and continuously extruding the polymer material through the changed flow passage.

The gist of the invention in another aspect resides in an apparatus for extrusion-molding a weather strip whose cross-sectional shape varies along its longitudinal direction, which apparatus comprises: a die formed with an opening having substantially the same shape as a fundamental cross-sectional shape of the weather strip and provided with a core for forming a hollow portion of the weather strip; a movable die disposed on a front surface of the die and being movable close to and away from a projecting portion provided on the core so as to project forward beyond the front surface; and an actuator for moving the movable die.

In accordance with the inventions of some aspects when extrusion-molding a weather strip which has a hollow portion and varies in external shape, it is not necessary to use a plurality of dies nor to mold a molded member for connecting a part of the weather strip having a fundamental cross-sectional shape and another part thereof having a different cross-sectional shape from the fundamental one, and therefore the complicated operation becomes unnecessary unlike the prior art. When forming that part of the weather strip in which the external shape has a concave portion as well, since a flow passage can properly be secured, it is possible to form into a predetermined shape without causing the concave portion to be crushed or bulged.

The gist of the invention in still another aspect resides in a method for extrusion-molding a weather strip whose cross-sectional shape varies along its longitudinal direction, which method comprises the steps of: extruding a polymer material through an opening formed in a die, the opening having substantially the same shape as a fundamental cross-sectional shape of the weather strip; moving a forward end surface of a movable core inserted in the opening between a position where it is flush with a front surface of the die and another position where it is in the die; and continuously extruding the polymer material through the opening after the forward end surface of the movable core is moved to be flush with the front surface of the die.

In accordance with the invention of at least one aspect by changing the cross-sectional shape of an opening of a die, it becomes possible to continuously form a weather strip whose cross-sectional shape is varied in internal shape of the hollow portion. In this case, the complexity accompanying the conventional weather strip molding process can be done away with in the same manner as previously described aspects.

Preferably, as a concrete technique of the weather strip extrusion-molding method according to one aspect of the invention, the movable core is used for forming a protruding portion in the hollow portion of the weather strip. It is preferred that the protruding portion is a bridge portion crossing inside the hollow portion. Further, it is also preferred that the movable core is used for changing the internal shape of a vehicle outer side wall of the hollow portion of the weather strip.

The gist of the invention according to yet another aspect, resides in an apparatus for extrusion-molding a weather strip whose cross-sectional shape varies along its longitudinal direction, which apparatus comprises: a die formed with an opening having substantially the same shape as a fundamental cross-sectional shape of the weather strip; a movable core inserted in the opening and being movable in its longitudinal direction to such an extent that it reaches at least a front surface of the die; and an actuator for moving the movable core.

In accordance with the invention of this aspect as well, by changing the cross-sectional shape of an opening of a die, it becomes possible to continuously form a weather strip whose cross-sectional shape is varied in internal shape of the hollow portion. In this case, the complexity accompanying the conventional weather strip forming process can be done away with in the same manner as previously described aspects.

Preferably, as a concrete construction of the weather strip extrusion-molding apparatus according to this aspect, the movable core is used for forming a protruding portion in a hollow portion of the weather strip and disposed in a gap in a fixed core for forming the hollow portion. Further, it is preferred that the movable core has a notch portion extending from a forward end surface thereof so that, when moved backward, the notch portion communicates with the gap, while when moved forward, the forward end surface becomes flush with the front surface of the die and the notch portion is closed. In addition, it is also preferred that the movable core is used for changing the internal shape of a vehicle outer side wall of the hollow portion.

The gist of the invention according to a further aspect resides in a weather strip comprising a part corresponding to a roof section of a motor vehicle and having a cross-sectional shape in which a concave portion is formed in a sealing wall and another part corresponding to a rear quarter section of the motor vehicle and having a cross-sectional shape in which the sealing wall is curved and a bridge portion is formed in a hollow portion, these parts being formed as one piece of extrusion member.

In accordance with the weather strip of this aspect, a part of the weather strip which is brought into contact with the upper edge of a door glass and required to have a reliable sealing performance (corresponding to the roof section) and another part thereof which is brought into contact with the rear edge of the door glass and required to have a proper sealing performance (corresponding to the rear quarter section) can be integrally formed, and therefore it is possible to reduce the cost.

DESCRIPTION OF THE PREFERRED EMBODIMENTS

Now, the present invention will be described hereinafter with reference to the drawings.

Figure 2:
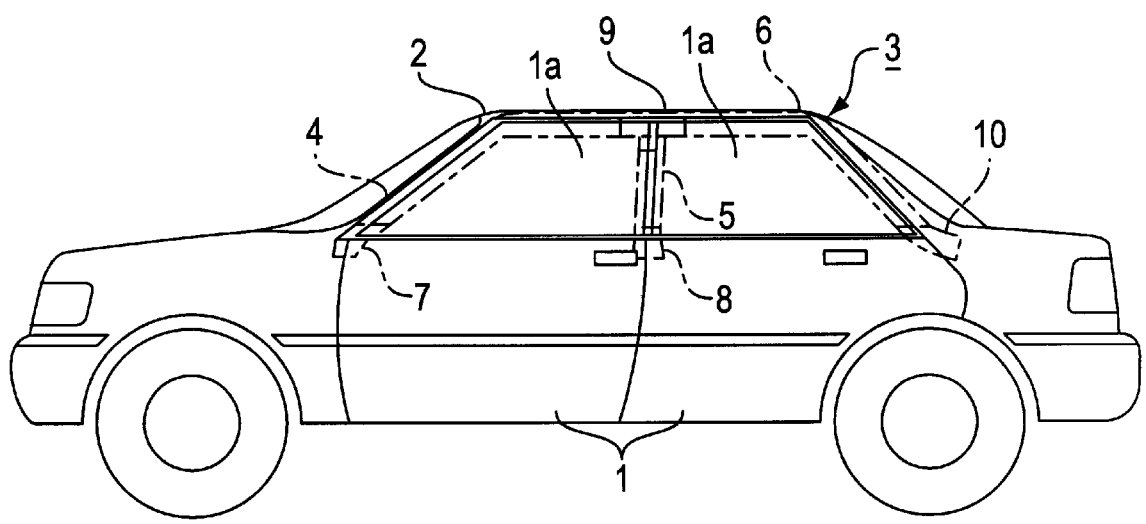
FIG. 2 is a side view of a car body for explanation of the section in which a weather strip according to the invention is attached.
Figure 3:
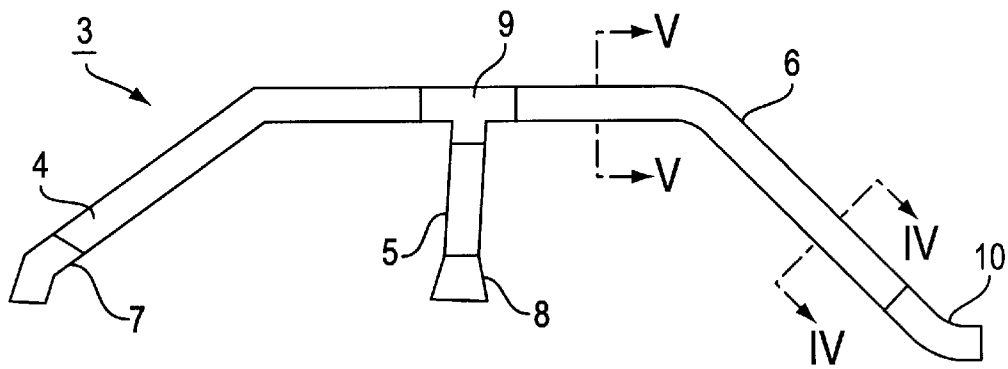
FIG. 3 is a schematic side view of the weather strip according to the invention.

As shown in FIGS. 2 and 3, in a car body 2 having doors 1, a weather strip 3 is attached to that portion of an opening of the car body 2 corresponding to circumference edges of door glasses 1a so as to extend along the outer circumference of the door glasses 1a, the weather strip 3 being formed from EPDM (ethylene-propylene-diene copolymerized rubber) which is a polymer material.

The weather strip 3 comprises extrusion members 4, 5, 6 and molded members 7, 8, 9, 10 (which are schematically shown in the drawings). Namely, the extrusion members 4 to 6 are formed into substantially straight (long) pieces by means of an extrusion-molding apparatus (not shown). Meanwhile, the molded members 7 to 10 are molded by means of a mold-molding apparatus (not shown) so that they are continuously connected to the extrusion members 4 to 6 adjacent thereto.

The present invention will be described below in detail taking the case of the extrusion member 6 corresponding to the opening for rear quarter section of the car body, but the same is true for the other extrusion members.

Figure 4:
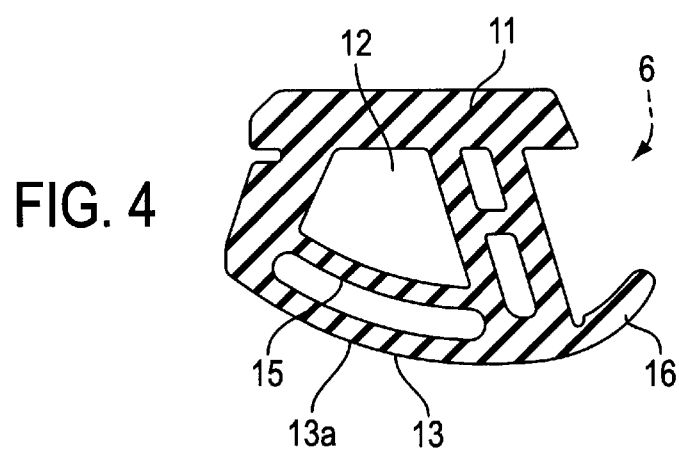
FIG. 4 is a sectional view taken along the line IV—IV in FIG. 3.
Figure 5:
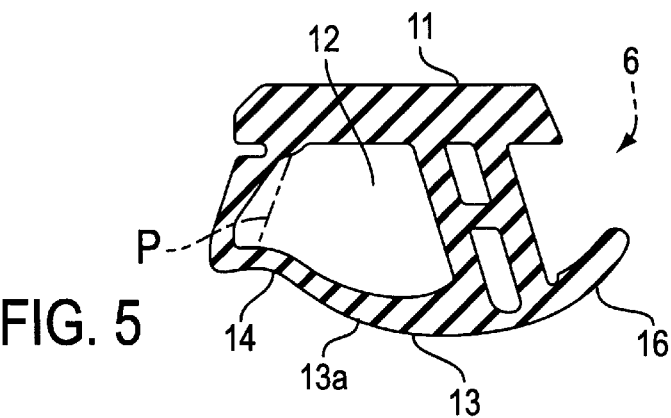
FIG. 5 is a sectional view taken along the line V—V in FIG. 3.

As shown in FIGS. 4 and 5, the extrusion member 6 of the weather strip 3 basically comprises a mounting base portion 11 which is to be attached to a retainer (not shown) or the like of the car body 2, and a sealing portion 13 projecting from the mounting base portion 11 and having an inside hollow portion 12. When the edge portion of the door glass 1a is abutted against a sealing wall 13a of the sealing portion 13, the sealing wall 13a deforms to provide a seal between the weather strip and the door glass edge portion. Incidentally, the sealing portion 13 is formed with a lip 16 extending from the sealing wall 13a.

Further, in the extrusion member 6, it is necessary for a part thereof corresponding to the roof section of the car body 2 to wrap up the upper edge of the door glass 1a with reliability but it is not so necessary for another part thereof corresponding to the rear quarter section of the car body 2 to wrap up the rear edge of the door glass 1a. For this reason, the cross-sectional shape of that part of the extrusion member 6 corresponding to the rear quarter section of the car body 2 (see FIG. 4) is different from the cross-sectional shape of that part thereof corresponding to the roof section (see FIG. 5) in the following items (a) to (c). Incidentally, in this embodiment, the cross-sectional shape of that part of the extrusion member 6 corresponding to the rear quarter section (see FIG. 4) is referred to as "a fundamental cross-sectional shape" for the sake of convenience.

(a) While the sealing wall 13a is substantially in the shape of a circular arc in the fundamental cross-sectional shape, the sealing wall 13a in the cross-sectional shape of the part corresponding to the roof section is formed with a concave portion 14 by curving inwards at least a portion of the outer peripheral form thereof.

(b) While a reinforcing bridge portion 15 is formed in a hollow portion 12 in the fundamental cross-sectional shape, no bridge portion 15 is formed in the hollow portion 12 in the cross-sectional shape of the part corresponding to the roof section.

(c) While a protruding portion P is provided on the vehicle outer side wall of the hollow portion 12 so as to increase the thickness of this wall in the fundamental cross-sectional shape, no protruding portion P is formed in the cross-sectional shape of the part corresponding to the roof section.

As described above, in this embodiment, such a weather strip is formed that differences of the above items (a) to (c) are recognized in a piece of extrusion member 6.

Figure 1:
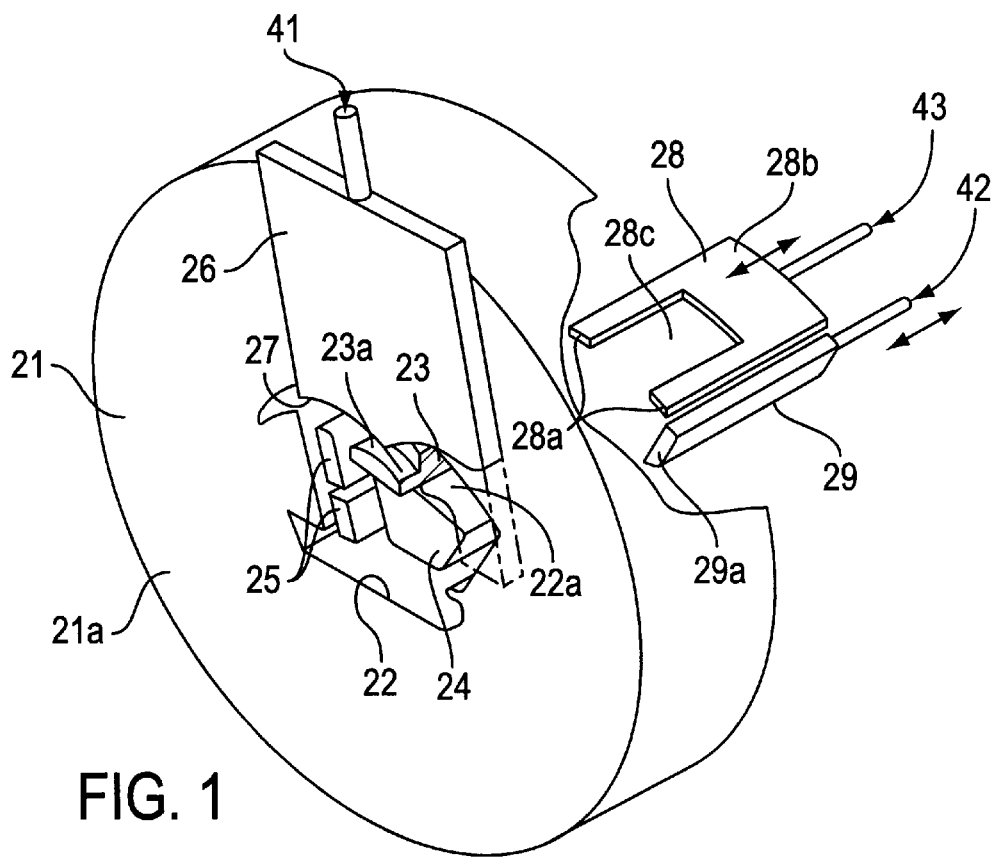
FIG. 1 is a perspective view of an extrusion-molding apparatus according to the present invention.

Now, description will be given of an extrusion-molding apparatus for forming the extrusion member 6 of the weather strip 3. FIG. 1 is a perspective view showing essential portions of an extrusion-molding apparatus used for forming the extrusion member 6. As shown in FIG. 1, the extrusion-molding apparatus is equipped with a die 21 for extrusion-molding unvulcanized EPDM. The die 21 is formed with an opening 22 having substantially the same shape as the fundamental cross-sectional shape of the extrusion member 6. By supplying the unvulcanized EPDM to the opening 22 by means of an extruder (not shown), the extrusion member 6 having the fundamental cross-sectional shape is forced out from a front surface 21a of the die 21.

The die 21 is provided with fixed cores, that is, a first core 23 and a second core 24 for forming the hollow portion 12 in the sealing portion 13 of the extrusion member 6. These cores 23, 24 are held and fixed in predetermined positions inside the die 21 by means of support posts (not shown). A gap 22a for forming the bridge portion 15 of the extrusion member 6 is formed between the cores 23 and 24. The first core 23 is formed with a projecting portion 23a which projects forward beyond the front surface 21a of the die 21.

A movable die 26 for changing the external shape of the sealing portion 13 is disposed on the front surface 21a of the die 21, the movable die 26 being able to move in the direction perpendicular to the direction in which EPDM is extruded (that is, in the vertical direction in the drawing) by the operation of an actuator 41. Namely, the movable die 26 is allowed to move between two positions, namely a position that a curved surface 27 formed at the forward end thereof is kept away from the projecting portion 23a of the first core 23 and another position that the curved surface 27 comes close to the projecting portion 23a.

When the movable die 26 is in the position that the curved surface 27 is kept away from the projecting portion 23a, the opening 22 of the die 21 is not shut so that the sealing portion 13 having the fundamental cross-sectional shape is formed through the passage formed by this opening 22. Meanwhile, when the movable die 26 is in the position that the curved surface 27 comes close to the projecting portion 23a, the opening 22 is partially shut up by the movable die 26 so that the sealing portion 13 having the cross-sectional shape of the part corresponding to the roof section is formed through another passage formed between the curved surface 27 and the projecting portion 23a.

Further, fixed cores 25 for forming a hollow portion in the vehicle inner side wall are disposed in the opening 22 of the die 21 in addition to the fixed cores 23, 24. Moreover, a first movable core 28 and a second movable core 29 are inserted in the opening 22, these movable cores 28, 29 being movable back and forth independently of each other in the direction in which EPDM is extruded by the operation of their respective actuators 43, 42. The movable cores 28, 29 are allowed to move between a position that forward end surfaces 28a, 29a thereof are hidden in the inner part of the opening 22 and another position that the forward end surfaces 28a, 29a are flush with the front surface 21a of the die 21. Incidentally, the actuators 41 to 43 are constituted by a servo-motor, an air cylinder, a hydraulic cylinder or the like, for example, and their operations are controlled by a controller (not shown).

An outline of the extrusion-molding apparatus of this embodiment has been described above. Now, in regard to the change in cross-sectional shape of the extrusion member 6, the manufacturing apparatus and the function thereof will be described below in detail in accordance with the items (a) to (c) mentioned above. However, in the following description, only the characteristic portions of the cross-sectional shape described in the items (a) to (c) are picked up and described one by one for the sake of convenience, and therefore there are some differences from the actual cross-sectional shapes (the cross-sectional shapes shown in FIGS. 4 and 5).

Figure 6:
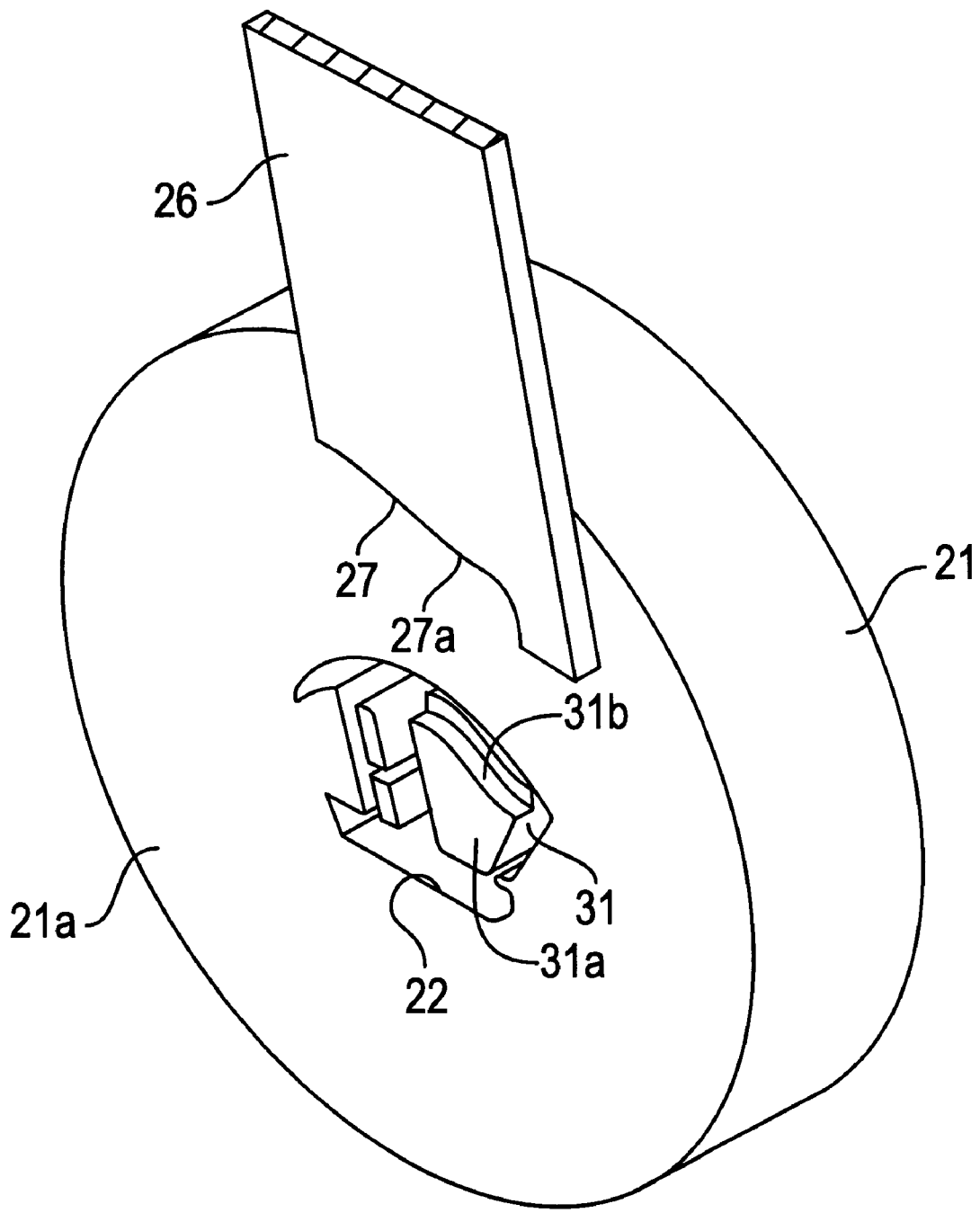
FIG. 6 is a perspective view of an extrusion-molding apparatus for changing the external shape of a sealing portion of the weather strip according to the invention.

First, the procedure for changing the external shape of the sealing portion 13 described in the item (a) will be described by referring to FIGS. 6 to 12. FIG. 6 is a perspective view showing a state that the movable die 26 is moved away. A core 31 disposed in the opening 22 of the die 21 for forming the hollow portion 12 (which corresponds to the first and second cores 23, 24 of FIG. 1 in the combined state) is formed with a projecting portion 31a which projects forward beyond the front surface 21a of the die 21. Meanwhile, a convex portion 27a is formed on the curved surface 27 at the forward end of the movable die 26. The projecting portion 31a of the core 31 is formed (in an upper surface thereof in the drawing) with a concave curved surface 31b for mating with the convex portion 27a.

Figure 7:
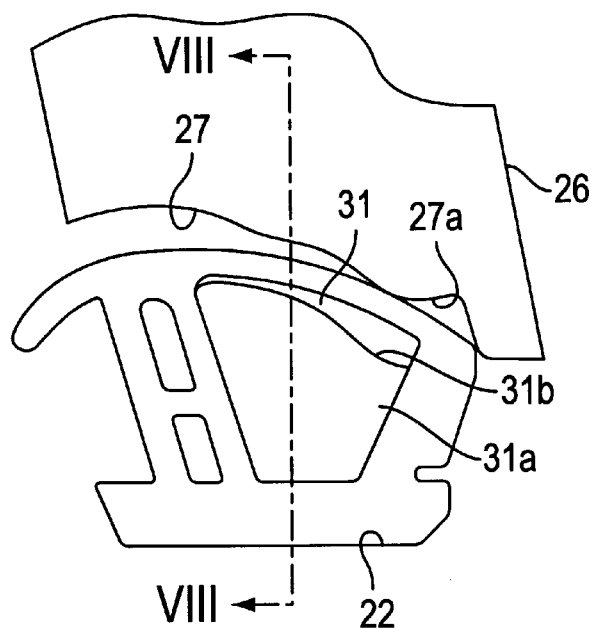
FIG. 7 is a front view of the extrusion-molding apparatus of FIG. 6, showing essential portions thereof in which a movable die is held in its moved-away position.
Figure 8:
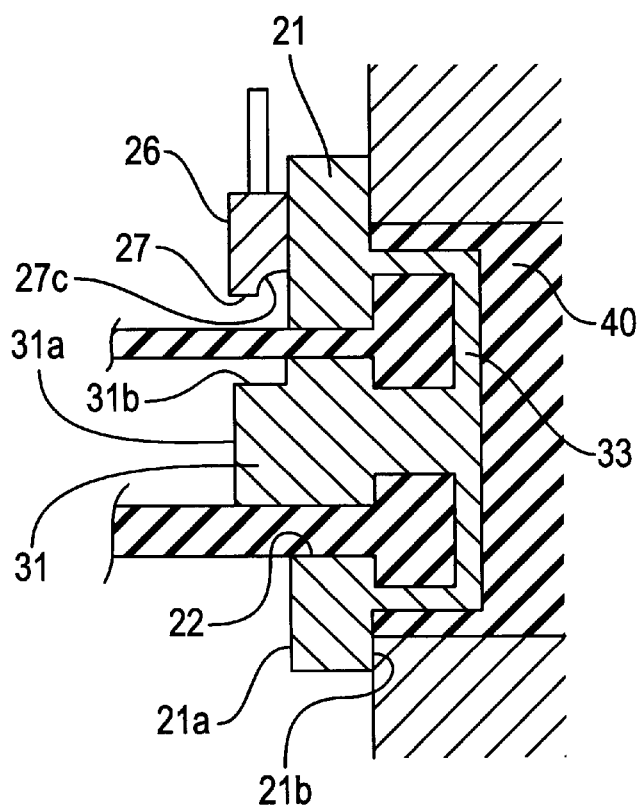
FIG. 8 is a sectional view taken along the line VIII—VIII in FIG. 7.
Figure 9:
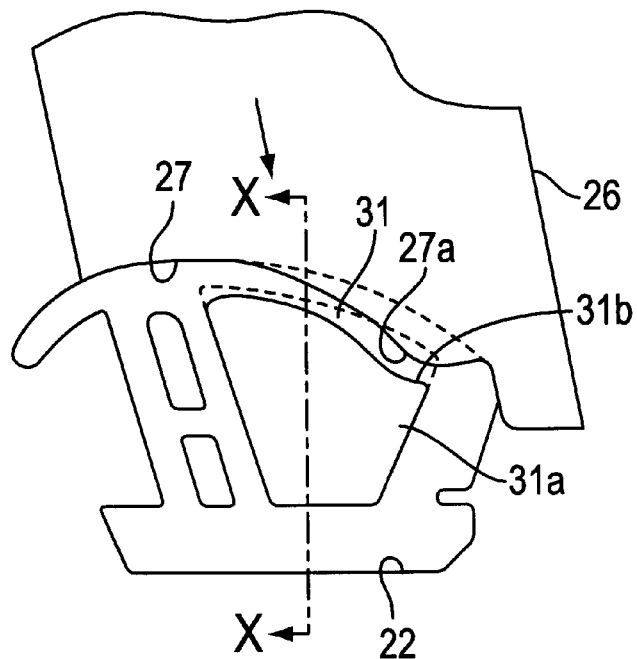
FIG. 9 is a front view of the extrusion-molding apparatus of FIG. 6, showing essential portions thereof in which the movable die is held in its approached position.
Figure 10:
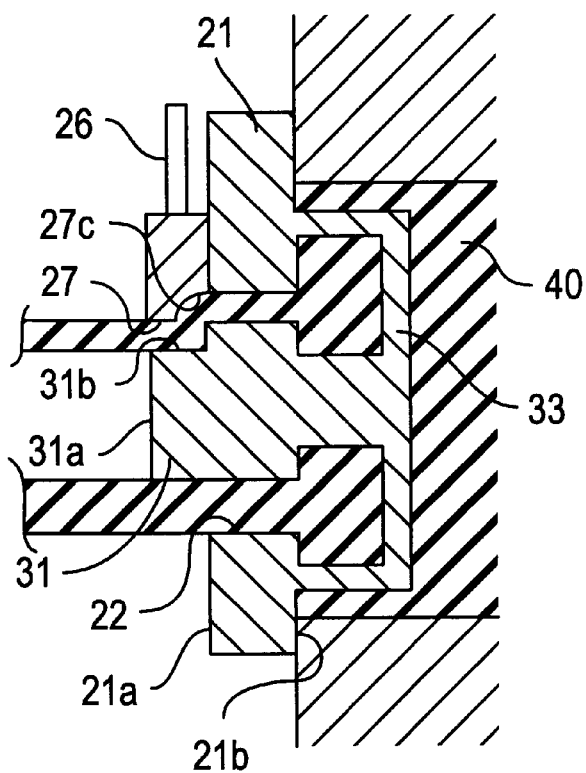
FIG. 10 is a sectional view taken along the line X—X in FIG. 9.

FIGS. 7 and 8 are a front view and a side sectional view showing the process of forming the fundamental cross-sectional shape of the extrusion member 6, and FIGS. 9 and 10 are a front view and a side sectional view showing the process of forming a different cross-sectional shape of the extrusion member 6 from the fundamental one. FIG. 8 is a sectional view taken along the line VIII—VIII in FIG. 7, and FIG. 10 is a sectional view taken along the line X—X in FIG. 9. In the drawings, reference numeral 27c denotes a notch formed in a portion of the curved surface 27 at the rear of the movable die 26, 33 denotes a support post for fixedly holding the core 31, and 40 denotes unvulcanized EPDM.

In FIGS. 7 and 8, the curved surface 27 of the movable die 26 is located in a position away from the projecting portion 31a of the core 31 so that the unvulcanized EPDM 40 is extruded through the passage formed by the opening 22 of the die 21. By this extrusion process, the extrusion member 6 having the cross-sectional shape of FIG. 11 in which the outer periphery of the sealing wall 13a of the sealing portion 13 is formed substantially in the shape of a circular arc, is formed.

In FIGS. 9 and 10, the curved surface 27 of the movable die 26 is located in a position close to the projecting portion 31a of the core 31. In this state, between the curved surface 27 of the movable die 26 and a curved surface 31b of the projecting portion 31a is formed another passage whose position is lower than that of the passage formed by the opening 22 of the die 21. The unvulcanized EPDM 40 is extruded through the thus-formed passage. By this extrusion process, the extrusion member 6 having the cross-sectional shape of FIG. 12 in which the outer periphery of the sealing wall 13a of the sealing portion 13 is formed with the concave portion 14 in a portion thereof, is formed.

Figure 11:
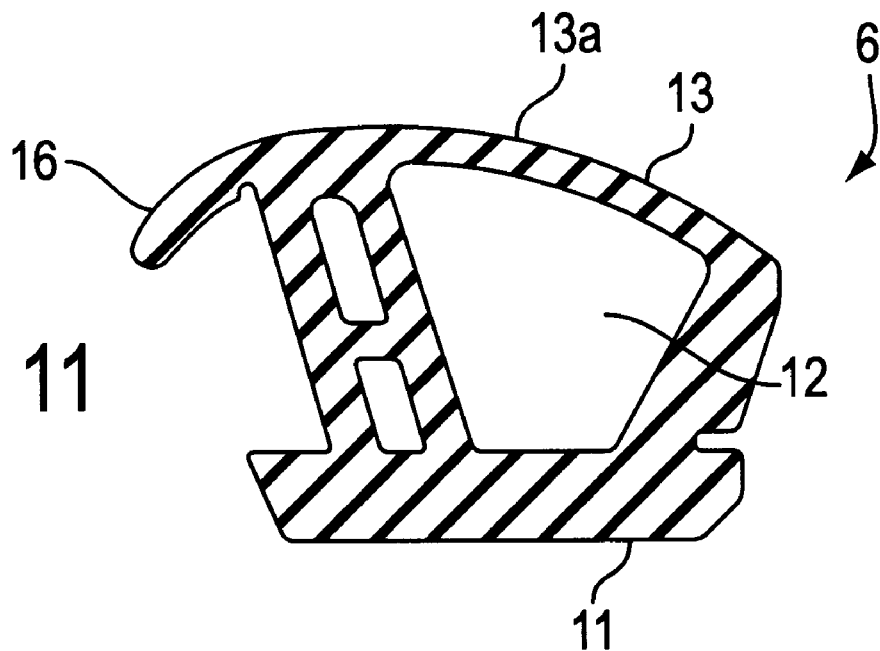
FIG. 11 is a sectional view of the weather strip made by the extrusion-molding apparatus shown in FIG. 7.
Figure 12:
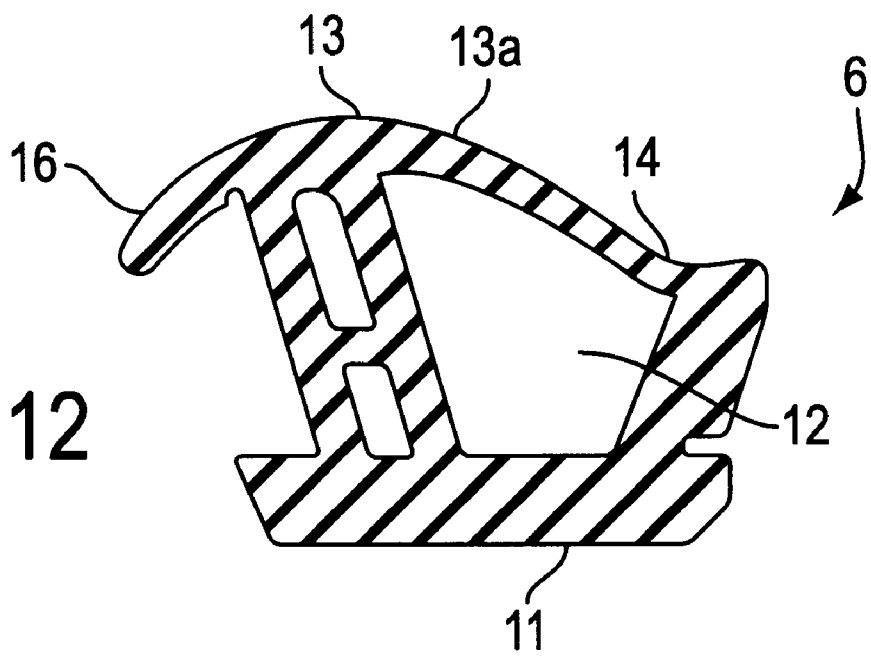
FIG. 12 is a sectional view of the weather strip made by the extrusion-molding apparatus shown in FIG. 9.

When continuously forming the extrusion member 6 having the cross-sectional shapes of FIGS. 11 and 12, the unvulcanized EPDM 40 is first extruded forward out of the extruder (not shown) in the conditions of FIGS. 7 and 8, in which case the fundamental cross-sectional shape of the extrusion member 6 is formed mainly by the opening 22 of the die 21. Then, after a predetermined time has elapsed, that is, when the EPDM is extruded as long as the point corresponding to the boundary between the roof section and the rear quarter section, the actuator 41 (see FIG. 1) is driven so as to move the movable die 26 to the position shown in FIGS. 9 and 10. Namely, the state of passage is changed from that of FIG. 8 to that of FIG. 10.

This change of passage allows the extrusion member 6 to be continuously changed in external shape along the longitudinal direction thereof. Incidentally, the unvulcanized EPDM 40 having undergone the extrusion molding is made to go through other processes in which a vulcanizer (not shown) for vulcanizing the EPDM 40, a cooling apparatus (not shown) for cooling the vulcanized EPDM, a shearing apparatus (not shown) for cutting the EPDM into a predetermined length and so on are used, and then manufactured as a final product of the extrusion member 6. However, in the present embodiment, detailed description of these apparatus is omitted because they are all known in the prior arts.

Figure 13:
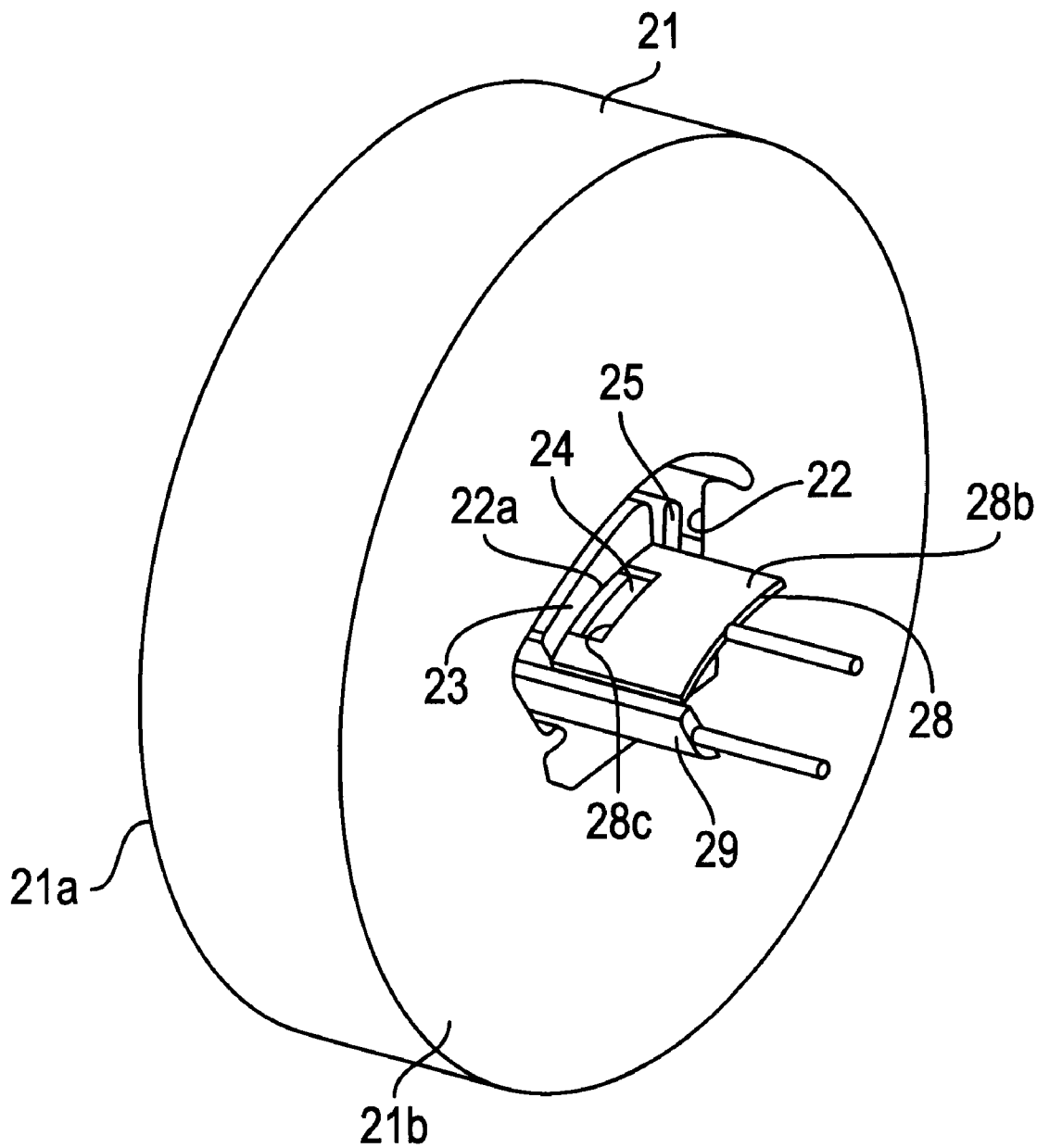
FIG. 13 is a perspective view, viewed from the rear side, of an extrusion-molding apparatus for changing the shape of a bridge portion of the weather strip according to the invention.

Secondary, in regard to the procedure for changing the bridge portion 15 which is the protruding portion in the hollow portion 12 and described in the item (b), the apparatus therefor and its function will be described by referring to FIGS. 13 to 19. FIG. 13 is a perspective view of the die 21 as viewed from the rear. Referring to FIG. 13, the gap 22a is formed between the fixed cores 23 and 24 in order to form the bridge portion 15 of the extrusion member 6, and the first movable core 28 of leveled U-shape is inserted in the gap 22a.

Figure 14:
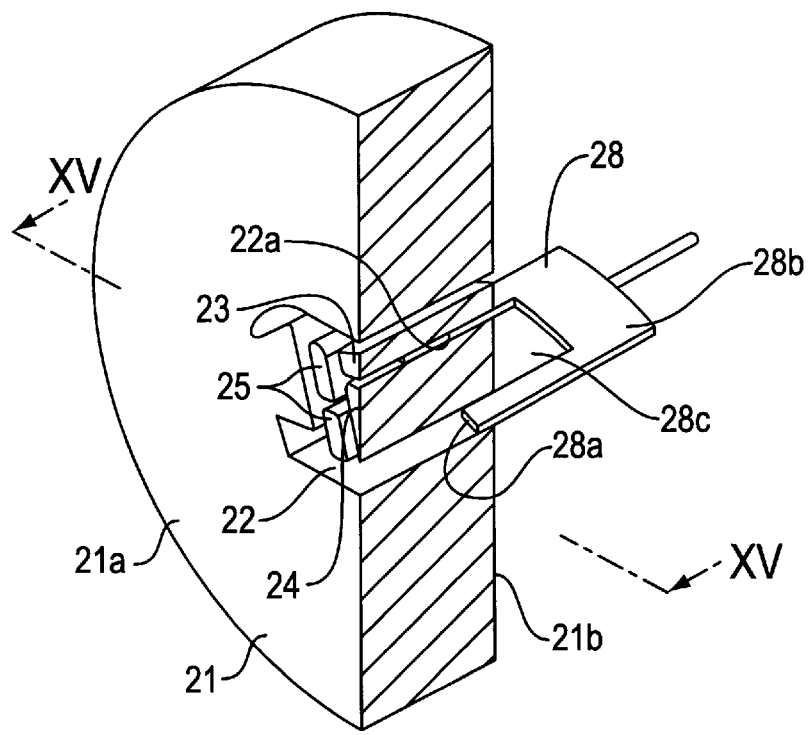
FIG. 14 is a sectional perspective view, viewed from the front side, of the extrusion-molding apparatus for changing the shape of the bridge portion of the weather strip according to the invention, in which a first movable core is held in its retreated position.
Figure 15:
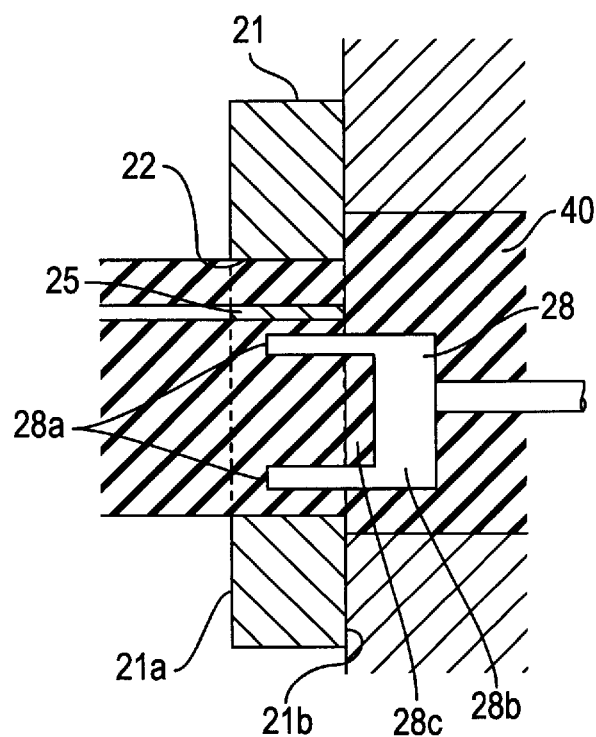
FIG. 15 is a sectional view taken along the line XV—XV in FIG. 14.

FIG. 14 is a fragmentary perspective view showing the process of forming the fundamental cross-sectional shape of the extrusion member 6, and FIG. 15 is a plan sectional view taken along the line XV—XV in FIG. 14. Further, FIG. 16 is a fragmentary sectional view showing the process of forming a cross-sectional shape in which the bridge portion 15 is eliminated from the fundamental cross-sectional shape of the extrusion member 6, and FIG. 17 is a plan sectional view taken along the line XVII—XVII in FIG. 16.

In FIGS. 14 and 15, the forward end surface 28a of the first movable core 28 is pulled backward from the front surface 21a of the die 21 and a plate-like proximal end portion 28b of the movable core 28 is located behind the rear surface 21b of the die 21. Since the first movable core 28 is pulled backward, the gap 22a in the die 21 is opened. The unvulcanized EPDM 40 gets into the gap 22a in the die through a notch 28c of the movable core 28 located between the plate-like proximal end portion 28b of the movable core 28 and the rear surface 21b of the die 21, and then is extruded forward through the gap 22a. By this extrusion process, the extrusion member 6 having the cross-sectional shape of FIG. 18 in which the bridge portion 15 is formed by extruding the EPDM 40 through the gap 22a, is formed.

Figure 16:
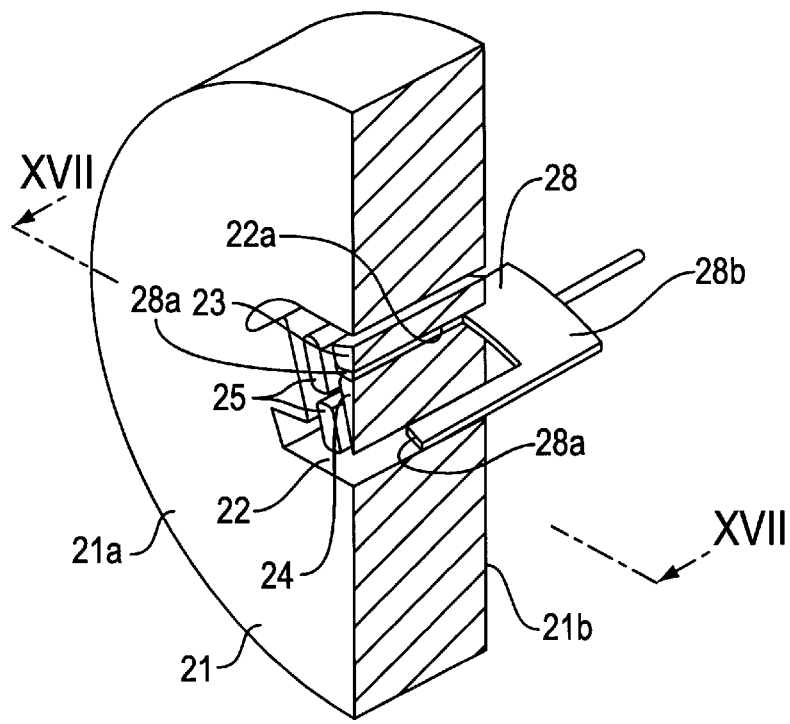
FIG. 16 is a sectional perspective view, viewed from the front side, of the extrusion-molding apparatus for changing the shape of the bridge portion of the weather strip according to the invention, in which the first movable core is held in its advanced position.
Figure 17:
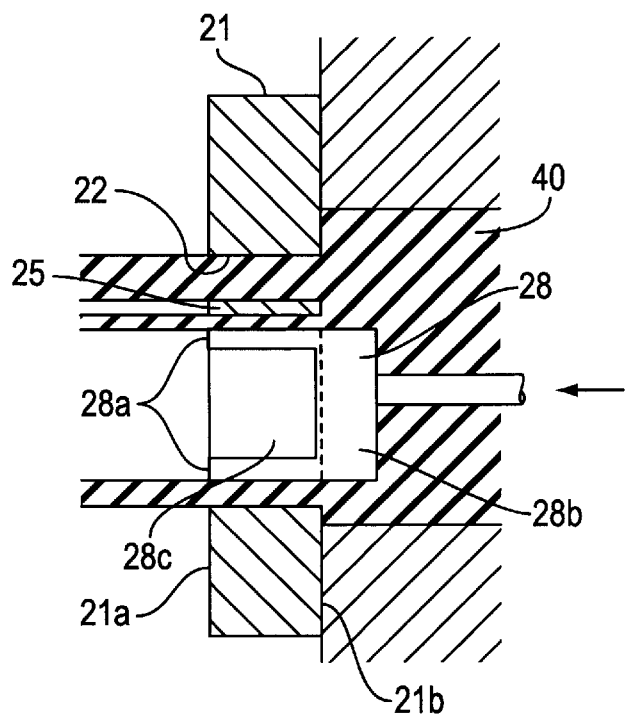
FIG. 17 is a sectional view taken along the line XVII—XVII in FIG. 16.

In FIGS. 16 and 17, the forward end surface 28a of the first movable core 28 is flush with the front surface 21a of the die 21 and the plate-like proximal end portion 28b is partially hidden in the gap 22a in the die 21. For this reason, the gap 22a in the die 21 is closed. Therefore, the unvulcanized EPDM 40 is not allowed to get into the gap 22a in the die 21. By this process, the extrusion member 6 having the cross-sectional shape of FIG. 19 in which the bridge portion 15 is not formed, is formed.

Figure 18:
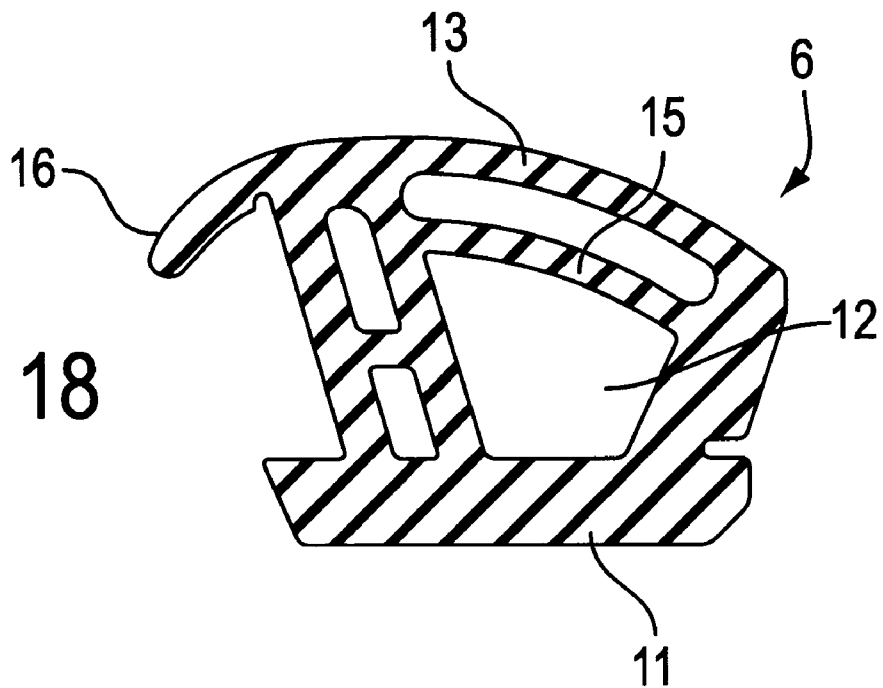
FIG. 18 is a sectional view of the weather strip made by the extrusion-molding apparatus shown in FIG. 14.
Figure 19:
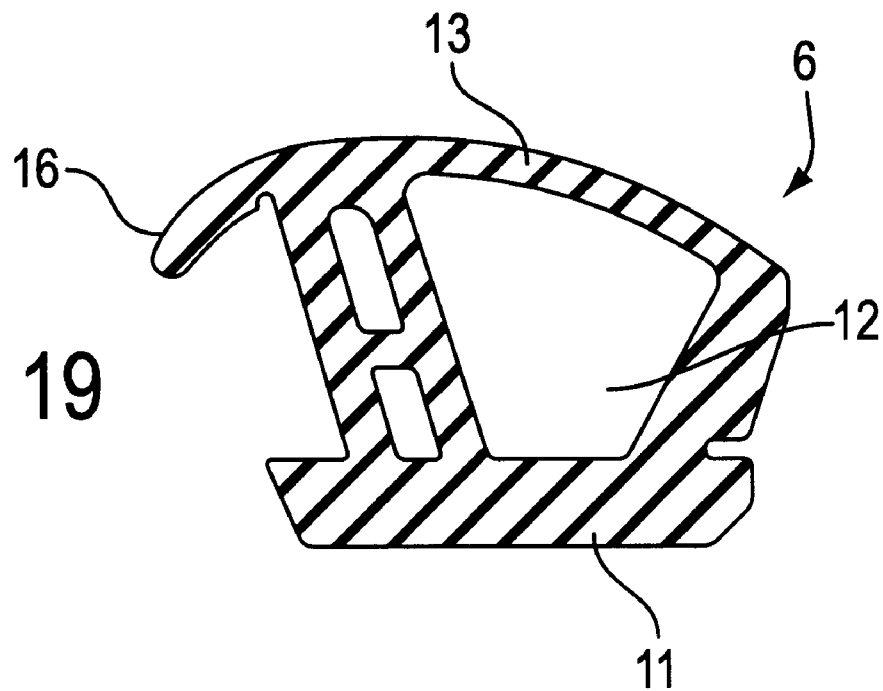
FIG. 19 is a sectional view of the weather strip made by the extrusion-molding apparatus shown in FIG. 16.

When continuously forming the extrusion member 6 having two cross-sectional shapes of FIGS. 18 and 19 as described above, the first movable core 28 is moved back as shown in FIGS. 14 and 15. Then, after a predetermined time has elapsed, that is, when the EPDM 40 is extruded as long as the point corresponding to the boundary between the roof section and the rear quarter section, the actuator 42 (see FIG. 1) is driven so as to move forward the first movable core 28 as shown in FIGS. 16 and 17. Owing to this movement of the first movable core 28, the bridge portion 15 is prevented from being formed continuously and disappearing gradually along the longitudinal direction of the extrusion member 6.

Figure 20:
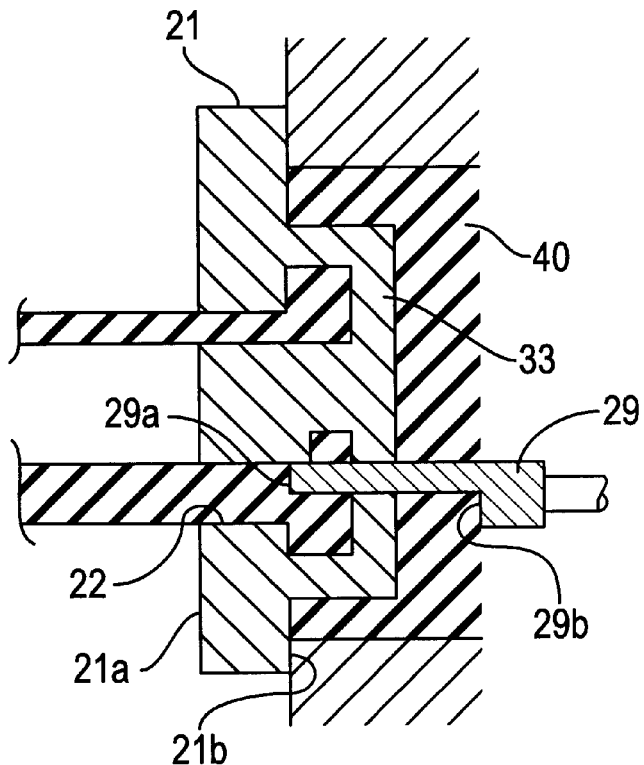
FIG. 20 is a sectional view of an extrusion-molding apparatus for changing the internal shape of the sealing portion of the weather strip according to the invention, in which a second movable core is held in its retreated position.
Figure 21:
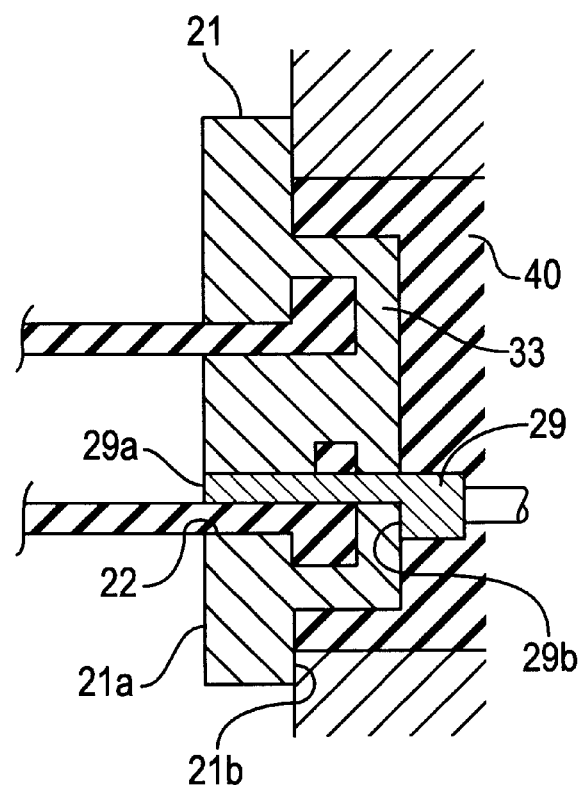
FIG. 21 is a sectional view of the extrusion-molding apparatus for changing the internal shape of the sealing portion of the weather strip according to the invention, in which the second movable core is held in its advanced position.
Figure 22:
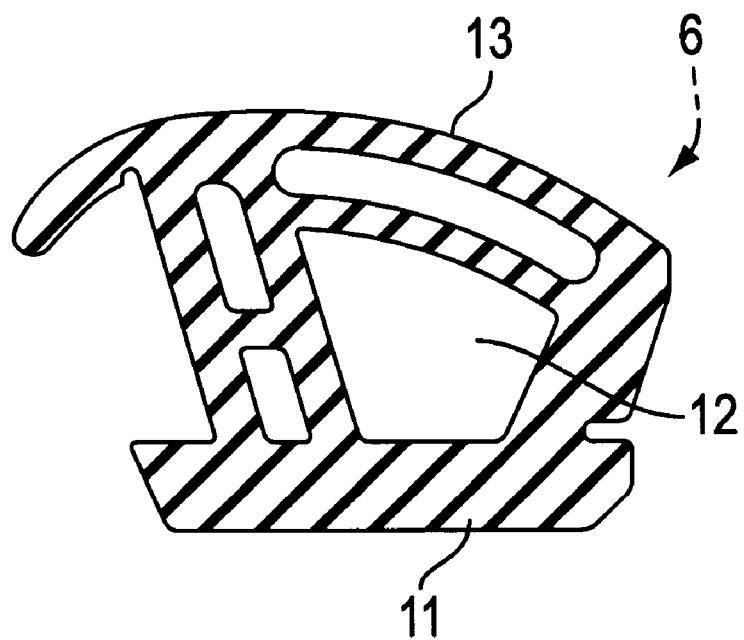
FIG. 22 is a sectional view of the weather strip made by the extrusion-molding apparatus shown in FIG. 20.
Figure 23:
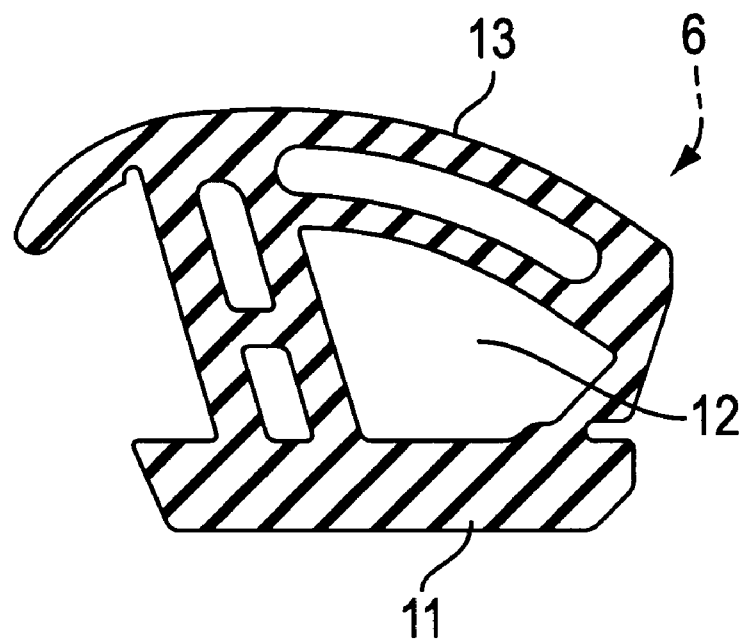
FIG. 23 is a sectional view of the weather strip made by the extrusion-molding apparatus shown in FIG. 21.

In regard to the procedure for changing the internal shape of the hollow portion 12 described in the item (c), the apparatus therefor and its function will be described by referring to FIGS. 13 and 20 to 23. In FIG. 13, the second movable core 29 is inserted in the opening 22 of the die 21. By moving the second movable core 29 back and forth with respect to the front surface 21a of the die 21, two cross-sectional shapes shown in FIGS. 22 and 23 are obtained. In the state of FIG. 20, the forward end surface 29a of the second movable die 29 is moved back from the front surface 21a of the die 21. For this reason, the EPDM 40 having a cross-sectional shape which is the same as the shape of the opening 22 of the die 21 is extruded forward, thereby forming the extrusion member 6 having the cross-sectional shape of FIG. 22.

Meanwhile, in the state end surface 29a of ward end surface 29a of the second movable die 29 is flush with the front surface 21a of the die 21. More specifically, the second movable core 29 is moved forward until a step portion 29b of the second movable core 29 is brought into contact with the support post 33. Therefore, the extrusion member 6 having the cross-sectional shape of FIG. 23 in which a portion of the inner peripheral wall of the hollow portion 12 is made thin, is formed.

When continuously forming the extrusion member 6 having the two cross-sectional shapes of FIGS. 22 and 23 as described above, the second movable core 29 is moved back as shown in FIG. 20 first of all. Then, after a predetermined time has elapsed, the actuator 43 (see FIG. 1) is driven so as to move forward the second movable core 29 as shown in FIG. 21. Owing to this movement of the second movable core 29, the internal shape of the hollow portion 12 is continuously changed along the longitudinal direction of the extrusion member 6.

As has been described in detail, by means of the apparatus for molding the extrusion member 6 according to the present invention, it is possible to form the weather strip whose cross-sectional shape is continuously changed with regard to the items (a) to (c). Incidentally, in the above description, the respective constructions and functions have been mentioned one by one, but actually the differences in construction for the items (a) to (c) are materialized in one apparatus as shown in FIG. 1, and hence the functions for obtaining the differences in construction are continuously performed in a chain of molding processes of the extrusion member 6. Attributed to this chain of molding processes, it is possible to manufacture a piece of extrusion member 6 having the two different cross-sectional shapes shown in FIGS. 4 and 5.

Advantages obtained by the present embodiment will be described in the following.

In this embodiment, the movable die 26 is moved on the front surface 21a of the die 21 so as to come in contact with and apart from the projecting portion of the fixed core which projects forward beyond the front surface 21a so that the passage for the unvulcanized EPDM for the sealing portion 13 of the extrusion member 6 is continuously changed. Further, the first movable core 28 is retractably inserted in the opening portion (the gap 22a) in the die 21 provided for forming the bridge portion 15. In addition, the second movable core 29 is retractably inserted into the opening 22 of the die 21 for the purpose of partially changing the shape of the inner peripheral wall of the hollow portion 12.

With the above construction, it becomes possible to continuously extrusion-mold the weather strip having the fundamental cross-sectional shape and the weather strip having the different cross-sectional shape from the fundamental one. This makes it unnecessary to use a plurality of dies and it also becomes unnecessary to mold the molded member which was needed for connecting the weather strips having different cross-sectional shapes in the prior art. In consequence, the complicated operation required in the prior art becomes unnecessary and equipment can be simplified, with the result that the working property can be improved and the cost can be reduced.

In the present embodiment, when forming the concave portion 14 of the extrusion member 6, the passage can properly be secured by the movable die 26 and the projecting portion of the fixed core, and therefore the concave portion 14 can be formed into the predetermined shape without being crushed nor bulged.

There has been known a conventional extrusion-molding apparatus in which length and shape of a lip portion are continuously changed but the inner peripheral shape of the hollow portion of the sealing portion 13 cannot be changed. However, in the present embodiment, the inner peripheral shape of the hollow portion of the sealing portion 13 can be changed.

The extrusion member 6 (of the weather strip 3) obtained according to this embodiment can be reinforced by the bridge portion 15 in that part thereof corresponding to the rear quarter section of the car body 2 so that the sealing performance of that part can appropriately be ensured. Meanwhile, in that part of the extrusion member 6 corresponding to the roof section of the car body 2, the concave portion 14 is formed in the sealing wall 13a of the sealing portion 13, and therefore the upper edge of the door glass 1a can be wrapped up with reliability due to the concave portion 14, thereby making it possible to improve the sealing performance.

Further, the present invention is not limited to the above embodiment and it may be constructed as follows, for example.

In the extrusion-molding apparatus of the above embodiment, the cross-sectional shape of the weather strip is changed between the fundamental cross-sectional shape and another cross-sectional shape different from the fundamental one in three points as already mentioned, but it is not always necessary to change the cross-sectional shape in three points by means of the same apparatus. For instance, an apparatus for changing the cross-sectional shape in any one or two points may be materialized and it may be applied to change of the cross-sectional shape in four or more points.

In the extrusion-molding process of the weather strip according to the above embodiment, the weather strip is so formed as to have the fundamental cross-sectional shape at first and then have the other cross-sectional shape different from the fundamental one, but this order may be reversed. Namely, first of all, the EPDM is extruded in the condition that the movable die 26 is held in its position close to the projecting portion 23*a* of the first fixed core 23 which projects forward beyond the front surface 21*a* of the die 21 so as to form the sealing portion 13 with the concave portion 14. Then, after a predetermined time has elapsed, the movable die 26 is moved away from the projecting portion 23*a* so as to mold the sealing portion 13 without the concave portion 14. Meanwhile, first of all, the forward end surfaces 28*a*, 29*a* of the first and second movable cores 28, 29 are made to be flush with the front surface 21*a* of the die 21 so as to form the weather strip having the cross-sectional shape in which the bridge portion 15 is not formed in the hollow portion 12 and the thickness of the vehicle outer side wall is thin. Then, after a predetermined time has elapsed, the first and second movable cores 28, 29 are moved backward so as to form the weather strip having the cross-sectional shape in which the bridge portion 15 is formed in the hollow portion and the thickness of the vehicle outer side wall is thick.

The projecting portion 23*a* of the first core 23 shown in FIG. 1 may be constituted as a movable core so that the projecting portion 23*a* can suitably be projected forward beyond the front surface 21*a* of the die 21. In this case, the movement of the movable core serving as the projecting portion 23*a* (in a direction to project forward beyond the position where it is flush with the front surface 21*a* of the die 21) may be linked with the movement of the movable die 26 in a direction to come close to the projecting portion 23*a* (downward movement in FIG. 1) or in a direction to move away from the same (upward movement in FIG. 1). Further, the projecting portion 23*a* is not limited to the one formed integrally with the first fixed core 23 but it may be provided separately.

Figure 24:
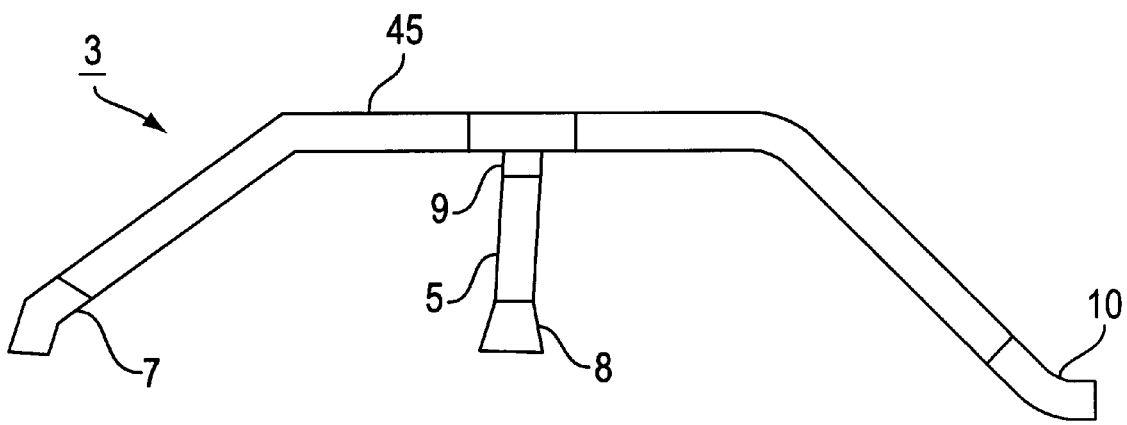
FIG. 24 is a schematic side view of another embodiment of a weather strip according to the present invention.

In the above embodiment, a piece of weather strip is extruded so as to correspond to the roof section and the rear quarter section. However, as shown in FIG. 24, a piece of extrusion member 45 may be formed as a weather strip which corresponds to all over the front pillar section, roof section and rear quarter section.

Figure 25:
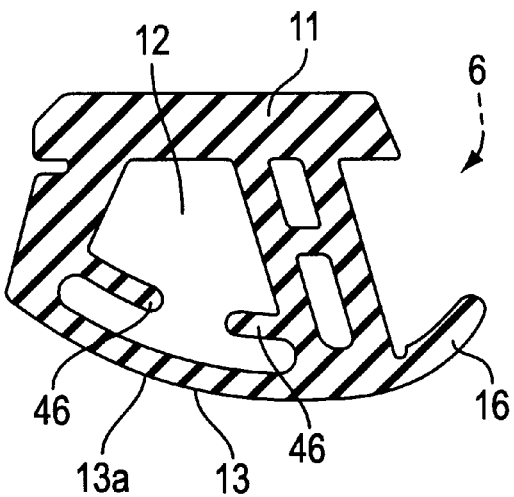
FIG. 25 is a sectional view of a different embodiment of the weather strip according to the invention.
Figure 26:
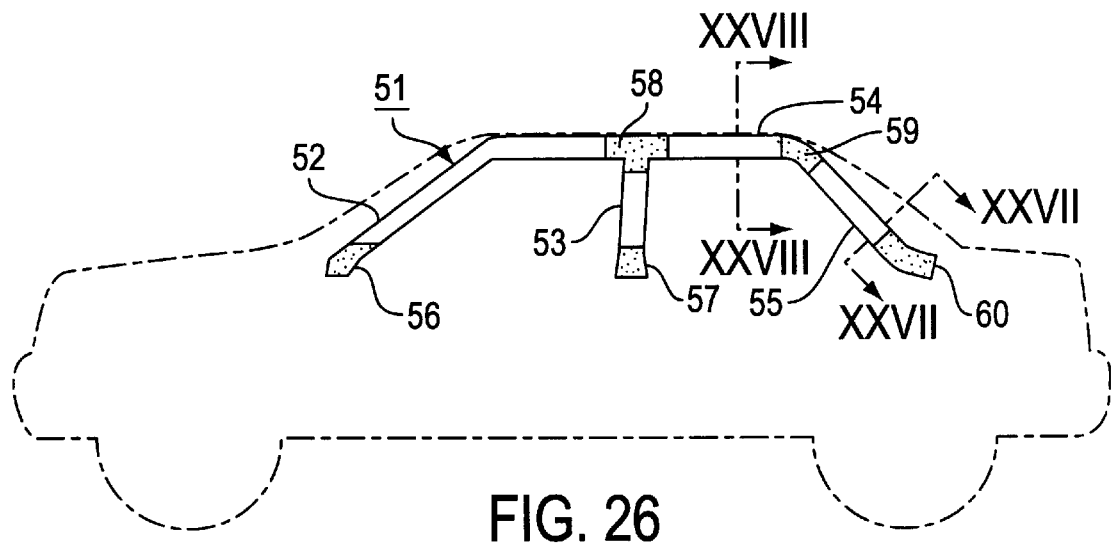
FIG. 26 is a schematic side view of a weather strip according to the prior art.
Figure 27:
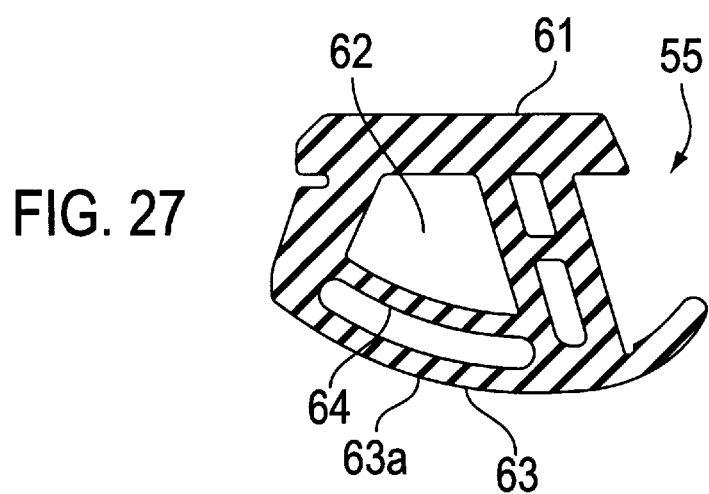
FIG. 27 is a sectional view taken along the line XXVII—XXVII in FIG. 26.
Figure 28:
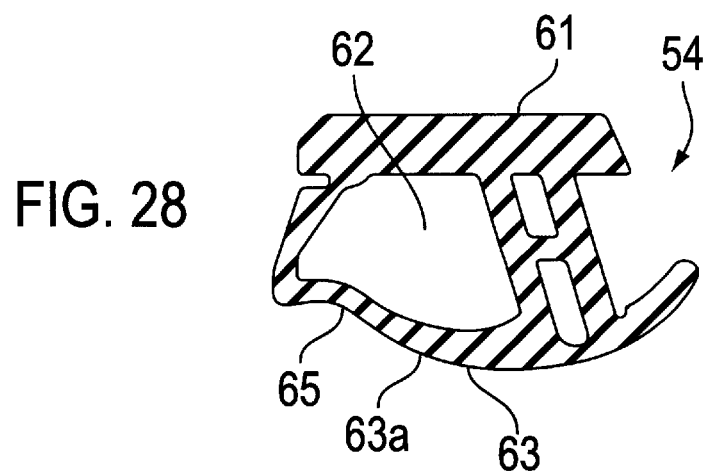
FIG. 28 is a sectional view taken along the line XXVIII—XXVIII in FIG. 26.

When forming the protruding portion (the bridge portion 15 in the above embodiment) in the hollow portion of the weather strip, the forward end surface 28*a* of the first movable core 28 may be held immediately before it becomes flush with the front surface 21*a* of the die 21 so that the EPDM 40 is allowed to slightly get into the gap 22*a* between the fixed cores 23, 24. Namely, in such case, a weather strip having a cross-sectional shape shown in FIG. 25 in which protruding portions 46 are formed, is obtained.

As for the polymer material, besides EPDM used in the above embodiment, various kinds of rubber including styrene-butadiene rubber, butadiene rubber, polychloroprene rubber, butyl rubber, nitrile rubber, ethylene-propylene copolymerized rubber and acrylic rubber, synthetic resin material having rubber-like elasticity, or thermoplastic resin and thermoplastic elastomer (TPE) may be used.

The above embodiment has been described as to the weather strip 3 attached to the opening of the car body 2, but the present invention can be applied to the weather strip attached to the door 1.

As has been described above in detail, according to the present invention, when manufacturing a weather strip whose cross-sectional shape is partially differed in the sealing portion or the hollow portion along the longitudinal direction thereof, it is possible to obtain such excellent advantages that the operation can be simplified and the cost can be reduced.

What is claimed is:

1. A method for extrusion-molding weather stripping having a cross-sectional shape which varies along its longitudinal direction, said method comprising:

extruding a polymer material through an opening formed in a die, the opening having substantially the same shape as a fundamental cross-sectional shape of the weather stripping including a hollow portion;

moving a movable core toward and away from the opening in the longitudinal direction between a position where the movable core blocks a portion of the opening and another position where the opening is unblocked;

wherein the movable core has a U-shape formed from a pair of legs with a notch therebetween and is used for forming a connecting element interiorly within the hollow portion of the weather stripping when in the unblocked position;

wherein said connecting element comprises a bridge member that extends across a portion of the inside area of the hollow portion;

whereby when the polymer material is extruded through the unblocked opening the bridge member is formed, and when the opening is partially blocked by the movable core the bridge member is not formed.

2. The method according to claim 1, wherein the movable core is held in the partially blocking position for a predetermined amount of time and then moved to the unblocking position.

* * * * *

UNITED STATES PATENT AND TRADEMARK OFFICE
CERTIFICATE OF CORRECTION

PATENT NO.      : 5,958,318
DATED           : September 28, 1999
INVENTOR(s)     : Keizo HAYASHI It is certified that error appears in the above-identified patent and that said Letters Patent is hereby corrected as shown below:

Title Page:     , please add:

--[30] Foreign Application Priority Data
   Jul. 1, 1996  [JP]  Japan........8-171036--.

Signed and Sealed this

Twenty-eighth Day of November, 2000

Attest:

Q. TODD DICKINSON

*Attesting Officer*          *Director of Patents and Trademarks*